United States Patent [19]

Himes

[11] Patent Number: 5,197,544
[45] Date of Patent: Mar. 30, 1993

[54] METHOD FOR CLAY STABILIZATION WITH QUATERNARY AMINES

[75] Inventor: Ronald E. Himes, Duncan, Okla.

[73] Assignee: Halliburton Company, Duncan, Okla.

[21] Appl. No.: 809,783

[22] Filed: Dec. 18, 1991

Related U.S. Application Data

[63] Continuation of Ser. No. 657,700, Feb. 28, 1991, Pat. No. 5,097,904.

[51] Int. Cl.$^5$ .................. E21B 33/138; E21B 43/26; E21B 43/27
[52] U.S. Cl. ................. 166/294; 166/305.1; 166/307; 166/308; 252/8.551; 252/8.553
[58] Field of Search .............. 166/271, 294, 305.1, 166/307, 308; 106/900; 252/8.551, 8.553, 8.554

[56] References Cited

U.S. PATENT DOCUMENTS

| | | | |
|---|---|---|---|
| 2,761,835 | 9/1956 | Brown | 252/8.554 |
| 2,761,840 | 9/1956 | Brown et al. | 252/8.554 X |
| 2,761,843 | 9/1956 | Brown | 252/8.554 X |
| 3,349,032 | 10/1967 | Krieg | 252/8.554 X |
| 3,768,566 | 10/1973 | Ely et al. | 166/308 |
| 4,462,718 | 7/1984 | McLaughlin et al. | 166/305.1 X |
| 4,842,073 | 6/1989 | Himes et al. | 166/294 |
| 4,974,678 | 12/1990 | Himes et al. | 166/308 |

*Primary Examiner*—George A. Suchfield
*Attorney, Agent, or Firm*—Thomas R. Weaver

[57] ABSTRACT

A method of treating a clay-containing subterranean formation with an aqueous fluid is disclosed. The method features the use of quaternary ammonium compounds as additives to control formation damage caused by contacting the formation with the aqueous fluid.

16 Claims, 1 Drawing Sheet

METHOD FOR CLAY STABILIZATION WITH QUATERNARY AMINES

CROSS REFERENCE TO RELATED APPLICATION

This application is a continuation of my prior copending application Ser. No. 07/657,700 filed Feb. 28, 1991, now U.S. Pat. No. 5,097,904.

BACKGROUND OF THE INVENTION

1. Field of the Invention

This invention relates to a method of and a fluid additive for treating subterranean formations containing clays. The additive finds particular use in aqueous stimulation fluids such as fracturing fluids.

2. Prior Art

The production of oil and gas from subterranean formations which contain clays and other fines is often impeded by the unstable nature of these materials. Clays and fines when in an undisturbed condition are stable and cause no obstruction to the flow of hydrocarbons through the formation. However, when these materials are disturbed by contact with an aqueous fluid that is foreign to the formation, the clays can swell and the fines can migrate through the capillary flow channels in the formation resulting in a reduction of formation permeability, which is sometimes referred to herein as formation damage.

Attempts to diminish the damaging effects of introduced aqueous fluids upon subterranean formations have included the conversion of clay contained in the formations from a swelling form to a less swelling form. This method of control has featured the addition of various salts to the aqueous fluids utilized in the treatment of subterranean formations. Inorganic salts such as potassium chloride, calcium chloride, and ammonium chloride have been dissolved in an aqueous fluid utilized to treat a formation. The solubilized salts enter into a cation exchange with the charged particles comprising the clays. While these salts often do diminish the reduction of formation permeability, they can be detrimental to the performance of other constituents of the treatment fluid. For example, the salts which are typically admixed with the aqueous fluid before admixture of any viscosifying or gelling agents to the aqueous fluid, may have a detrimental effect upon the viscosity yield by the gelling agent upon hydration in the aqueous fluid.

Furthermore, such salts, and particularly those containing chloride ions, are finding environmental objections and are therefore preferably to be avoided. Accordingly, it would be desirable to provide an environmentally acceptable method and additive by which a subterranean formation can be protected from the damaging effects of foreign aqueous fluids wherein the treating fluid used can be prepared simply and without detrimental effects to fluid constituents.

SUMMARY OF THE INVENTION

By this invention there is provided a method of treating a subterranean clay-containing formation comprising contacting said formation with an aqueous fluid whereby damage to the formation caused by contact with the aqueous fluid is reduced or substantially eliminated. The aqueous fluid can be a fluid containing a gelling agent which increases the viscosity of the fluid. The aqueous fluid can have a range of pH values extending from acidic to basic. The formation treatment can be for the purpose of enhancing the recovery of fluids from the formation such as by a fracture stimulation treatment and/or an acid stimulation treatment.

A formation treatment performed for the purpose of enhancing the recovery of fluids, such as oil or gas, from the formation at least partially depends for success upon increasing the permeability of the formation. If the treating fluid itself tends to damage the formation by decreasing the permeability thereof then steps must be taken to reduce or substantially eliminate such damage.

The problem of reducing or substantially eliminating the damaging effect of an aqueous fluid upon a clay-containing subterranean formation was specifically addressed in U.S. Pat. No. 4,842,073 to Himes, et al., who disclose therein the addition to the aqueous fluid of certain quaternary ammonium compounds to stabilize the formation and to thus reduce or to substantially eliminate damage to the formation caused by the aqueous fluid.

The quaternary ammonium compounds disclosed by Himes, et al., and referred to as formation control additives, consist of specified quaternary ammonium cations and, principally, halide as well as other disclosed inorganic anions. These formation control additives act to reduce or eliminate the decrease in the permeability of clay-containing formations contacted by an aqueous fluid. The phrase, formation damage, and similar such descriptions utilized by Himes, et al., and also as used in this invention, refer to the decrease in the permeability of a clay-containing formation caused by contact thereof with an aqueous fluid.

This invention provides formation control additives useful in aqueous fluids in amounts effective to prevent damage to clay-containing formations contacted by the aqueous fluids. The formation control additives of this invention, being liquid phase compounds, are easily handled by conventional equipment and are readily soluble in useful quantities in aqueous fluids used in conventional formation treating and stimulation procedures. The formation control additives are not known to interfere with the function of other additives known to be useful in aqueous treating fluids, for example, gelling agents.

In addition to the above benefits, and in another aspect of this invention, it is believed that certain of the fluid additives employed herein can be used without adverse affect upon animal, soil and water resources. These certain fluid additives are quaternary ammonium carboxylates and thus biodegrade to environmentally acceptable end products.

DESCRIPTION OF THE PREFERRED EMBODIMENT

Figure 1:
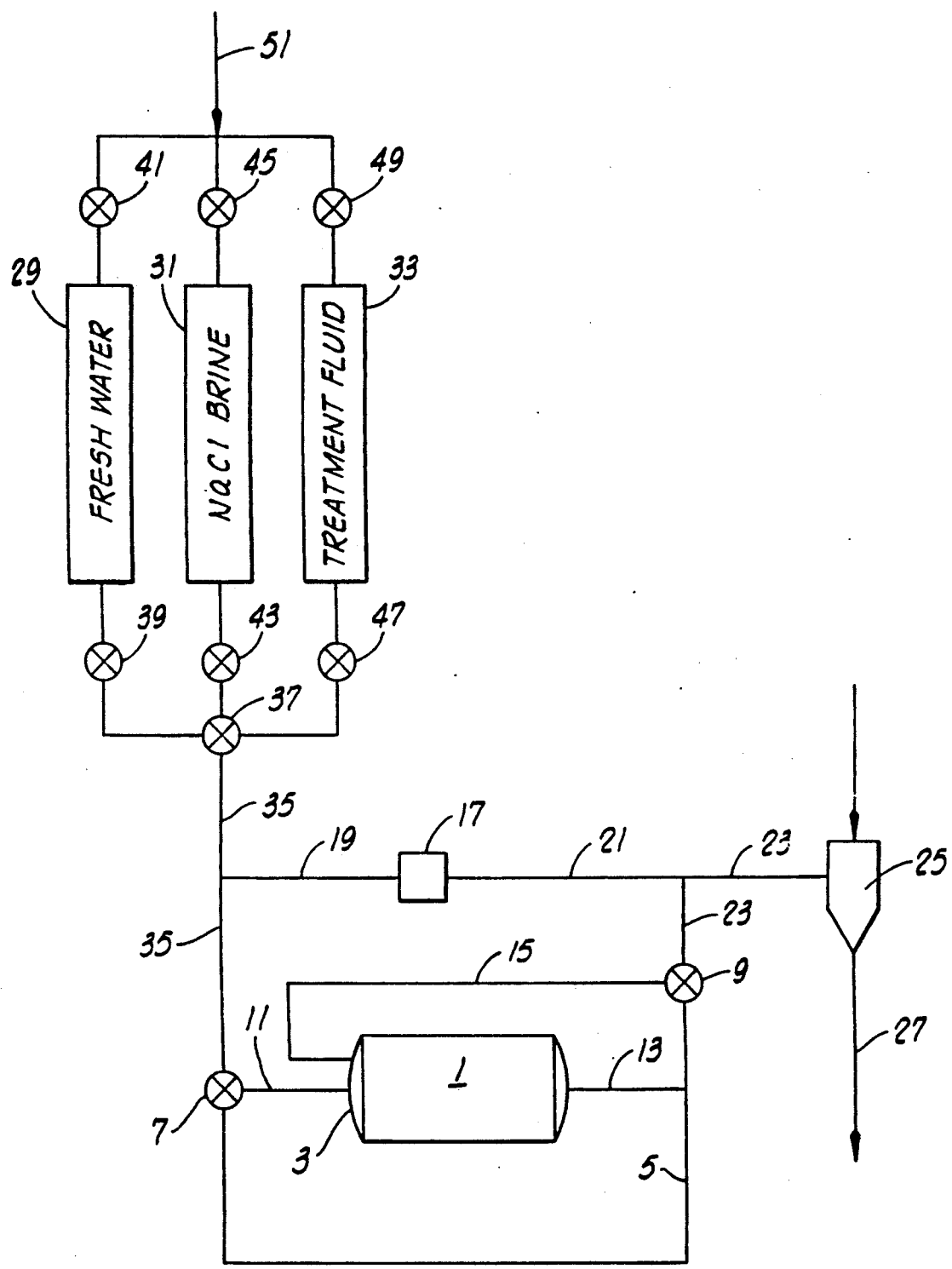
FIG. 1 is a diagrammatic schematic illustration of the test apparatus utilized in the Examples.

Hydraulic fracturing is well known as a method for stimulating the flow of fluids, such as oil or gas, from a subterranean formation. According to the method, a subterranean formation is contacted by a fluid at a flow rate and pressure at least sufficient to create or extend a fracture into a desired portion of the formation. The fracturing fluid normally contains a proppant which is transported into the fracture to prevent the fracture from completely closing once pressure is released. Various fluids have been utilized in hydraulic fracturing, however, most fluids in current use are aqueous-based liquids.

A fracturing fluid can be prepared by admixing a quantity of a solvatable polysaccharide gelling agent with an aqueous liquid. Solvatable polysaccharides include galactomannan gums, glucomannan gums, cellulose derivatives and the like. The fracturing fluid may also include a crosslinking agent for the gelling agent as well as other additives. For example, the fluid can contain bactericides, gel breakers, iron control agents, foaming agents such as surfactants, gases or liquified gases, stabilizers and the like. The preparation of fracturing fluids and the use of various additives therein are well known to individuals of ordinary skill in the art. The selection of the particular fracturing fluid constituents such as the gelling agent, crosslinking agent, breaker, stabilizer and the like is not critical to the successful operation of the present invention.

Aqueous fracturing fluids can also include a formation stabilization additive. The formation stabilization additives utilized have been water soluble inorganic salts such as potassium chloride, ammonium chloride, sodium chloride and calcium chloride. As previously indicated these salts can be difficult to use and can have detrimental effects upon certain properties of the gelled fluid such as reducing the viscosity produced by a gelling agent in the aqueous fluid in comparison to the viscosity produced by the gelling agent in fresh water. These compounds have been utilized, however, because of the ion-exchange properties of the clays present in the subterranean formations to be treated and the ability of these chemicals to provide some degree of formation stabilization through ion-exchange with the clays.

Included among the clays which can be effectively treated in accordance with the present invention are clay minerals of the montmorillonite (smectite) group such as montmorillonite, saponite, nontronite, hectorite, and sauconite; the kaolin group such as kaolinite, nacrite, dickite, and halloysite; the hydrousmica group such as hydrobiotite, glauconite, illite and bramallite; the chlorite group such as chlorite and chamosite; clay minerals not belonging to the above groups such as vermiculite, attapulgite, and sepiolite, and mixed-layer varieties of the above minerals and groups. The clay content of the formations can be comprised substantially of a single species of clay mineral, or of several species, including the mixed-layer types of clay. Clay minerals commonly encountered in subterranean formations which are subject to the difficulties herein noted and which can be treated effectively in accordance with the present invention are those selected from the montmorillonite group, hydrousmica group, chlorite group, kaolin group and mixed layer types. It will be understood that the clay formations treated in accordance with the invention need not be composed entirely of clay but may contain other mineral components associated therewith.

Clays can swell, disperse, disintegrate or otherwise become disrupted in the presence of foreign aqueous fluids. A clay which swells is not limited to expanding lattice-type clays but includes all those clays which can increase in bulk volume with or without dispersing, disintegrating or otherwise becoming disrupted when placed in contact with foreign aqueous solutions such as water, and certain brines. Certain clays can also disperse, disintegrate or otherwise become disrupted without swelling in the presence of foreign aqueous solutions such as water, certain brines, and emulsions containing water or certain brines. Some clays, in the presence of foreign aqueous solutions, will expand and be disrupted to the extent that they become unconsolidated and produce particles which migrate into a borehole. Formations which consist largely of clay upon absorbing water in a confined space can develop pressures on the order of several thousands of pounds per square inch.

The clay materials defined above occur as minute, plate-like, tube-like and/or fiber-like particles having an extremely large surface area as compared to an equivalent quantity of a granular material such as sand. This combination of small size and large surface area results in a high surface energy with attendant unusual surface properties and extreme affinity for surface-active agents. The structure of some of these clays, for example, montmorillonite, can be pictured as a stack of sheet-like three-layer lattice units which are weakly bonded to each other and which are expanded in the "c" crystallographic direction by water or other substances which can penetrate between the sheets and separate them. The cation exchange capacity of Montmorillonite is in the range of from about 90 to 130 milliequivalents per 100 grams of pure clay; that of illite is in the range of from about 20 to 40 milliequivalents; and that of kaolinite is in the range of from about 5 to 15 milliequivalents.

Clays include cations which occupy base-exchange positions or sites. A "base-exchange position or site" is defined as an area on the surface of a clay crystal which has associated with it an exchangeable cation. Cations generally found on a base-exchange position or site include sodium, potassium, calcium, magnesium, iron and hydrogen as well as other types. These cations are believed to be held on the clay surface by ionic forces.

Cations occupying the base-exchange sites on clay can be those originally present thereon or those placed thereon by liquids placed in contact therewith. Accordingly, the nature and concentration of ions in an aqueous liquid placed in contact with the clay can determine the cations occupying the base exchange sites. In most oil well formations the connate water associated therewith contain sodium as the predominate cation, with calcium, magnesium and other cations present in much smaller quantities. Since base-exchange positions on clay are occupied by cations, in many cases the cation will be sodium when connate waters are sodium containing. Unfortunately, however, as for example in the case of the sodium form of montmorillonite, these clay minerals swell in the presence of foreign water or certain brines and can, in some instances, exert pressures up to thousands of pounds per square inch. Thus, dependent upon the nature and amount of water absorbed, the clay can change to a rigid paste or a gelatinous mass, or if sufficient water is present, the clay can disperse completely into the aqueous phase.

The swelling or dispersion of clays can significantly reduce the permeability of a formation. The use of salts as formation control additives has not eliminated formation damage as a result of permeability reduction, but can reduce or minimize such damage.

The formation control additives employed in aqueous treating fluids used in the treating methods of this invention are certain quaternary ammonium compounds having inorganic anions and carboxylate anions. Those quaternary ammonium compounds having carboxylate anions being entirely organic in nature are biodegradable and thus enjoy a greater environmental acceptance than those which do not have carboxylate anions.

The additives useful herein are selected from compounds of the general formulas:

AR₁ Z,
AR₂A Z,
R₁BR₁ Z,
R₁BR₂BR₁ Z,
CR₃ Z,

R₁DR₁ Z
    R₁

E Y, and

R₁
R₁FR₁ Z
    R₁ wherein

A represents the group

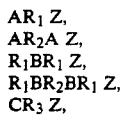

B represents the group

C represents the group

D represents the group

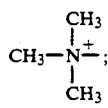

E represents the group

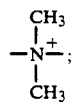

and
F represents

and further wherein:

$R_1$ is selected from the groups, —CH₂COOH, —CH₂CH₂OH, —CH₂CH₂CH₂OH and —CH₂CHOHCH₃;

$R_2$ is selected from the groups, —CH₂CH₂—, —CH₂CHOHCH₂—, —CH₂CH₂CH₂—, —CH₂CH₂CH₂CH₂—, and —CH₂CH₂OCH₂CH₂—;

$R_3$ is selected from the groups,

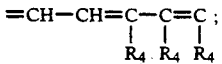

$R_4$ is independently hydrogen and the group —(CH₂)ₙCH₃ wherein n has a value in the range of 0 to 5 and at least one of said $R_4$ substituents is said —(CH₂)ₙCH₃ group;

Z is an anion selected from halides, nitrates, nitrites, sulfites, sulfates and carboxylates; and Y is an anion selected from carboxylates.

The halide can be fluoride, chloride, bromide or iodide.

The carboxylates through to be useful as anions herein are believed to be any water soluble carboxylate, examples of which include:

formate, HCOO⁻;
acetate, CH₃COO⁻;
hydroxyacetate, HOCH₂COO⁻;
lactate, CH₃CHOHCOO⁻;
citrate, ⁻OOCCH₂COH(COO⁻)CH₂COO⁻; and
benzoate, C₆H₅COO⁻;

Numerical coefficients are not shown on the above formulas; however, it is recognized that to maintain electrical neutrality, sufficient cation portions and/or sufficient anion portions are present to properly balance the equations of the formulas. Thus, for example, a specific quaternary ammonium citrate may have three cation portions and one anion portion, but would be represented herein by the general formula AR₁Z; also a specific diquaternary ammonium halide may have one cation portion and two anion portions but would be represented herein by the general formula AR₂AZ. Specific compounds found useful herein which are within the scope of the above formulas are:

2-Hydroxy-N,N-Bis(2-Hydroxy Ethyl)-N-Methyl Ethanaminium Chloride
N,N,N-Trimethyl Methanaminium Acetate
2-Hydroxy-N,N,N-Trimethyl Ethanaminium Citrate
N-Methyl Alkyl Pyridinium Chloride
2-Hydroxy-N,N,N-Trimethyl Ethanaminium Chloride
2-Hydroxy-N,N,N-Trimethyl-1 Propanaminium Acetate
2-Hydroxy-N,N,N-Trimethyl Ethanaminium Formate
2-Hydroxy-N,N,N-Trimethyl-1 Propanaminium Formate
1-Carboxy-N,N,N-Trimethyl Methanaminium Chloride
1,3-Bis(Trimethanaminium), 2-Propanol Dichloride
2-Hydroxy-N,N,N-Trimethyl Ethanaminium Acetate
1,2-Bis(Trimethanaminium) Ethane Dichloride
2-Hydroxy-N-(2-Hydroxy Ethyl)-N,N-Dimethyl Ethanaminium Chloride The formation control additives of this invention, which are quaternary ammonium compounds, are admixed with aqueous treating fluids in an amount effective to substantially stabilize a claycontaining formation against permeability reduction as a result of contact between the formation and the fluid. An effective amount of the formation control additive is believed to be about 0.05 percent additive by weight of the aqueous fluid. The formation control additive is preferably present in an amount in the range of from about 0.1 to about 5 more preferably 0.1 to about 0.6 and still more preferably 0.15 to about 0.5 percent additive by weight of the aqueous fluid.

The formation control additive can be admixed with the aqueous fluid, such as an aqueous fracturing fluid, at any time prior to contact of the fluid with the subterranean formation. The formation control additives of this invention are readily available as liquid solutions, therefore they readily admix with the constituents of an aqueous fracturing fluid both prior to and subsequent to hydration of the gelling agent. The use of the formation control additives is particularly advantageous in stimulation treatments performed with liquid gel concentrates such as for example those described in U.S. Pat. Nos. 4,312,675; 4,435,217; 3,894,880; 3,894,879; and 4,466,890.

The formation control additive is effective in treating a subterranean formation when transported in an aqueous carrier fluid having either an acid, alkaline or neutral pH in the range of from about 1 to 11 without any significant detrimental effect upon the additive.

The formation control additive may be admixed with the constituents of an aqueous liquid gel concentrate during its preparation whereupon the gel remains storage stable. The additive may be admixed with the gel concentrate when the gelled fluid is prepared by introduction of the control additive into a mixing vessel or blender together with other fluid additives. The formation control additives of the present invention do not exhibit mixing problems associated with previously used salts and do not appear to have any significant detrimental effect upon the hydration or ultimate yield of the gelling agent utilized to prepare a gelled fluid such as a fracturing fluid.

The following examples are presented to illustrate the effectiveness of the formation control additives in the prevention of substantial permeability reduction upon contact of an aqueous fluid with a clay-containing formation. The examples are not to be considered as limitations upon the scope of the present invention but are presented for illustration only. All quantities, proportions and percentages are by weight and all tests were performed at room temperature unless otherwise indicated.

EXAMPLES

Referring now to FIG. 1, there is illustrated, in schematic format, a diagram of equipment utilized in the Examples. Thus, a core sample to be tested is mounted in a Hassler sleeve test cell, 1, having one end thereof designated as the formation side, 3, and the other end thereof designated as the wellbore side, 5. The direction of fluid flowing through cell 1 from side 3 to side 5 is referred to as the production direction, and the direction of fluid flowing through cell 1 from side 5 to side 3 is referred to as the treatment direction.

The equipment includes a 3-way, high pressure ball valve, 7, and a 3-way, high pressure ball valve, 9. Thus, by appropriate manipulation of ball valves 7 and 9 fluids can be directed through cell 1 via lines 11, 13 and 15 in either the production direction or the treatment direction.

The pressure difference across cell 1 between formation side 3 and wellbore side 5 is measured by differential pressure transducer, 17, mounted between lines 19 and 21 wherein line 19 exhibits the pressure of fluid entering cell 1 via lines 11 or 13 and line 21 exhibits the pressure of fluid exiting cell 1 via lines 13 or 15.

Transducer 17 is connected to a computer, not shown, that contains and stores permeability data pertaining to the core being tested and fluid volume data pertaining to the volume of fluid passing through the core being tested.

All fluid flowing through the equipment system shown in FIG. 1 exits the system via lines 23, back pressure regulator 25 and line 27.

All fluid entering cell 1 originates from one of three vessels 29, 31 or 33 via lines 35 and selection valve 37. Each of vessels 29, 31 and 33 can be isolated from the system by isolation valves 39 and 41, 43 and 45, and 47 and 49 respectively. By appropriate manipulation of valves 37, 39, 41, 43, 45, 47 and 49 fluid can be caused, as described below, to flow from one of vessels 29, 31 or 33 and into and through cell 1 in either the production direction or the treatment direction (as defined above).

In addition to the above, all fluids entering the system are passed through a 0.5 micron filter (not shown) prior to entering cell 1.

Fluids entering the system must overcome resistance to flow offered by back pressure generated by regulator 25 as well as resistance offered by the core itself in cell 1 and resistance offered by tubing and valves. This total resistance is overcome by applying pressure to vessels 29, 31 and 33 via line 51 which is connected to a constant displacement high pressure pump (not shown). Light mineral oil is moved by the pump into the tops of vessels 29, 31 and 33 to displace therefrom the fluid contained therein and into and through cell 1. In the tests, back pressure regulator 25 maintains a constant pressure of 300 psig in lines 23 on the discharge side of cell 1.

As mentioned above fluid to be passed through cell 1 originates from vessels 29, 31 and 33. Vessel 29 contains deionized water; vessel 31 contains a 5 percent solution of sodium chloride and vessel 33 contains the treatment fluid.

In operation of the equipment the initial permeability, $K_i$, of the core maintained in cell 1 is obtained by flowing the sodium chloride solution from vessel 31 through the core in the production direction. The length of the core in cell 1 is selected as being the average depth of invasion of fluids into a formation during a fracturing treatment.

Upon determination of initial permeability, $K_i$, the pump rate is reduced to zero and the equipment valves manipulated to permit fluid flow through the core in cell 1 in the treatment direction at which time one pore volume (pv) of treatment fluid from vessel 33 is caused to be passed through cell 1 in the treatment direction. Thereafter, the pump rate is again reduced to zero and the equipment valves again manipulated to permit fluid flow through the core in cell 1 in the production direction at which time the sodium chloride solution from vessel 31 is again passed through the core to obtain final permeability, $K$. Any change between initial permeability, $K_i$, and final permeability, $K$, is caused by the treatment fluid. Core damage is indicated where $K_i$ is greater than $K$. Another indication of permeability change is indicated by the ratio, $K/K_i$, of final permeability to initial permeability. Where the ratio is less than one, permeability has been reduced (i.e. damage); where the ratio is one or more permeability has been preserved or improved (i.e. no damage).

Various different treatment fluids were utilized in accordance with the above test procedure. The test results obtained for each treatment fluid are provided in terms of the ratio, $K/K_i$, reported as a percent; that is, final core permeability is expressed as a percent of initial core permeability.

It is believed that the test procedure described does obtained by Himes, et al. using substantially the same test method described above and reported in Table II of U.S. Pat. No. 4,842,073 are also reported in Table I below.

TABLE I

OHIO SANDSTONE CORE

| Chemical Compound | Abbreviation | Structure | % Solution | $K/K_i$, % |
|---|---|---|---|---|
| Deionized Water | DI | — | — | 72 |
| Potassium Chloride Solution | KCl | — | 0.1 | 74 |
| Tetramethylammonium Halide | TMAC | $CH_3-N^+(CH_3)_3\ X^-$ | 0.1 | 109 |
| Tetrabutylammonium Halide | TBAC | $C_4H_9-N^+(C_4H_9)_3\ X^-$ | 0.5 | 93 |
| N,N,N-Trimethylphenyl-ammonium Halide | TMAI | $CH_3-N^+(CH_3)_2(C_6H_5)\ X^-$ | 0.5 | 80 |
| N-Methylpyridinium Halide | MEPY | N-methylpyridinium $X^-$ | 0.5 | 100 |
| N,N-Dimethylmorpholinium Halide | DMMI | N,N-dimethylmorpholinium $X^-$ | 0.5 | 96 |
| Methyl Quaternary Ammonium Salt of 2 Mole Oligomer of Epihalohydrin | EPIQ | $HOCH(CH_2OH)CH_2-N^+(CH_3)_3\ X^- \cdots\ CH_2-N^+(CH_3)_3\ X^-$ | 0.5 | 94 | simulate the formation damage that could result from the introduction of an aqueous fluid into a subterranean formation.

After final permeability, K, is obtained, fresh water from vessel 29 is then passed through cell 1 in the production direction to obtain water permeability, $K_w$. If the ratio $K_w/K_i$ is less than the ratio $K/K_i$, then the core tested is considered to be water sensitive and it is concluded that the test conducted is a valid test of the effect of the particular treating fluid on a water sensitive sample.

In every test reported herein, the water permeability test confirmed that all core samples tested were water sensitive.

EXAMPLE 1

This invention is related to the invention disclosed and claimed in U.S. Pat. No. 4,842,073 issued Jun. 27, 1989, to Himes, et al., which discloses and claims treating fluids used for the same purpose utilized herein but which contain formation stabilization additives which are chemically distinct from the ones disclosed and claimed herein. For purposes of comparison only results

EXAMPLE 2

Utilizing the test procedure described above with respect to FIG. 1, aqueous treatment fluids were passed through Ohio Sandstone Cores to determine the damaging effect of the fluid on the cores. The treatment fluids consisted of water solutions of the formation control additives of this invention present in the fluids in the amount of 0.5 percent additive by total weight of fluid.

The test results, which are provided in Table II, include the chemical identity of the fluid additive, the general structure thereof, the percent additive in the fluid by weight of fluid and the core damage expressed in terms of final permeability as a percent of initial permeability.

TABLE II

OHIO SANDSTONE CORE

| Test | Chemical Compound Name | General Structure | % Solution | $K/K_i$, % |
|---|---|---|---|---|
| 1 | 2-Hydroxy-N,N-Bis (2-Hydroxy Ethyl)- | $R_1DR_1\ Z$ $R_1$ | 0.5 | 87.8 |

TABLE II-continued

OHIO SANDSTONE CORE

| Test | Chemical Compound Name | General Structure | % Solution | $K/K_i$, % |
|---|---|---|---|---|
| | N-Methyl Ethanaminium Chloride | | | |
| 2 | N,N,N-Trimethyl Methanaminium Acetate | E Y | 0.5 | 89.0 |
| 3 | 2-Hydroxy-N,N,N-Trimethyl Ethanaminium Citrate | $AR_1Z$ | 0.5 | 90.5 |
| 4 | N-Methyl Alkyl Pyridinium Chloride | $CR_3Z$ | 0.5 | 92.6 |
| 5 | 2-Hydroxy-N,N,N-Trimethyl Ethanaminium Chloride | $AR_1Z$ | 0.5 | 97.2 |
| 6 | 2-Hydroxy-N,N,N-Trimethyl-1 Propanaminium Acetate | $AR_1Z$ | 0.5 | 97.5 |
| 7 | 1-Carboxy-N,N,N-Trimethyl Methanaminium Chloride | $AR_1Z$ | 0.5 | 97.5 |
| 8 | 1,3-Bis(Trimethanaminium), 2-Propanol Dichloride | $AR_2A\ Z$ | 0.5 | 98.3 |
| 9 | 2-Hydroxy-N,N,N-Trimethyl Ethanaminium Acetate | $AR_1Z$ | 0.5 | 99.5 |
| 10 | 1,2-Bis(Trimethanaminium) Ethane Dichloride | $AR_2A\ Z$ | 0.5 | 100.0 |
| 11 | 2-Hydroxy-N-(2-Hydroxy Ethyl)-N,N-Dimethyl Ethanaminium Chloride | $R_1BR_1\ Z$ | 0.5 | 100.0 |

The results clearly illustrate the substantially nondamaging effect on a formation core sample upon exposure thereof to an aqueous fluid containing the formation stabilization additive of the present invention. The preferred embodiment of the present invention has been described herein; however changes and modifications in the method and compositions described can be made by one skilled in the art without departing from the spirit or scope of the invention as set forth in the appended claims.

What is claimed is:

1. A method of treating a subterranean formation comprising contacting said formation with an aqueous treatment fluid containing a formation control additive in an amount effective to stabilize said formation, said additive comprising a quaternary ammonium compound selected from compounds of the general formulas:

$R_1BR_1\ Z$,
$R_1BR_2BR_1\ Z$, $R_1DR_1\ Z$ and
$R_1$ $R_1$
$R_1FR_1\ Z$
$R_1$ wherein
B represents the group

D represents the group

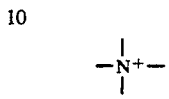

and
F represents $-\overset{|}{\underset{|}{N^+}}-$ and further wherein:
$R_1$ is selected from the groups $-CH_2COOH$, $-CH_2CH_2OH$, $-CH_2CH_2CH_2OH$ and $-CH_2CHOHCH_3$;
$R_2$ is selected from the groups $-CH_2CH_2-$, $-CH_2CHOHCH_2-$, $-CH_2CH_2CH_2-$, $-CH_2CH_2CH_2CH_2-$, and $-CH_2CH_2OCH_2CH_2-$, and
Z is an anion selected from halides, nitrates, nitrites, sulfites, sulfates and carboxylates.

2. The method of claim 1 wherein said formation control additive is present in said treatment fluid in an amount of about 0.05% by weight of said treatment fluid.

3. The method of claim 1 wherein said formation control additive is present in said treatment fluid in an amount of from about 0.1 to about 5% by weight of said treatment fluid.

4. The method of claim 3 wherein said treatment fluid has a pH in the range of from about 1 to about 11.

5. The method of claim 4 wherein said quaternary ammonium compound is selected from the group consisting of: 2-Hydroxy-N,N-Bis(2-Hydroxy Ethyl)-N-Methyl Ethanaminium Chloride and 2-Hydroxy-N-(2-Hydroxy Ethyl)-N,N-Dimethyl Ethanaminium Chloride.

6. The method of claim 1 wherein said treatment fluid includes a gelling agent.

7. The method of claim 1 wherein said quaternary ammonium compound is selected from compounds of said general formula $R_1BR_1\ Z$.

8. The method of claim 7 wherein $R_1$ is selected from said groups $-CH_2CH_2OH$ and $-CH_2CHOHCH_3$ and Z is selected from halides, nitrates and carboxylates.

9. A method of stimulating the production of hydrocarbons from a clay-containing subterranean formation comprising contacting said formation with an aqueous treatment fluid under conditions sufficient to create at least one fracture in said formation to thereby stimulate the production of hydrocarbons from said formation: wherein said aqueous treatment fluid is comprised of an aqueous fluid and a formation control additive present in said treatment fluid in an amount effective to stabilize said formation, said additive comprising a quaternary ammonium compound selected from compounds of the general formulas:

$R_1BR_1\ Z$,
$R_1BR_2BR_1\ Z$,

-continued $R_1DR_1$ Z and
$R_1$ $R_1$
$R_1FR_1$ Z
$R_1$ wherein

B represents the group

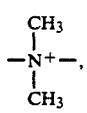

D represents the group

and

F represents

and further wherein:

$R_1$ is selected from the groups —CH$_2$COOH, —CH$_2$CH$_2$OH, —CH$_2$CH$_2$CH$_2$OH and —CH$_2$CHOHCH$_3$;

$R_2$ is selected from the groups —CH$_2$CH$_2$—, —CH$_2$CHOHCH$_2$—, —CH$_2$CH$_2$CH$_2$—, —CH$_2$CH$_2$CH$_2$CH$_2$—, and —CH$_2$CH$_2$OCH$_2$CH$_2$—; and Z is an anion selected from halides, nitrates, nitrites, sulfites, sulfates and carboxylates.

10. The method of claim 9 wherein said formation control additive is present in said treatment fluid in an amount of about 0.05% by weight of said treatment fluid.

11. The method of claim 9 wherein said formation control additive is present in said treatment fluid in an amount of from about 0.1 to about 5% by weight of said treatment fluid.

12. The method of claim 9 wherein said treatment fluid includes a gelling agent.

13. The method of claim 9 wherein said treatment fluid has a pH in the range of from about 1 to about 11.

14. The method of claim 13 wherein said quaternary ammonium compound is selected from the group consisting of: 2-Hydroxy-N,N-Bis(2-Hydroxy Ethyl)-N-Methyl Ethanaminium Chloride and 2-Hydroxy-N-(2-Hydroxy Ethyl)-N,N-Dimethyl Ethanaminium Chloride.

15. The method of claim 9 wherein said quaternary ammonium compound is selected from compounds of said general formula $R_1BR_1$ Z.

16. The method of claim 15 wherein $R_1$ is selected from said groups —CH$_2$CH$_2$OH and —CH$_2$CHOHCH$_3$ and Z is selected from halides, nitrates and carboxylates.

* * * * *